L. J. WOGENSTAHL.
AUTOMOBILE LAMP.
APPLICATION FILED JUNE 21, 1910.
991,587.
Patented May 9, 1911.
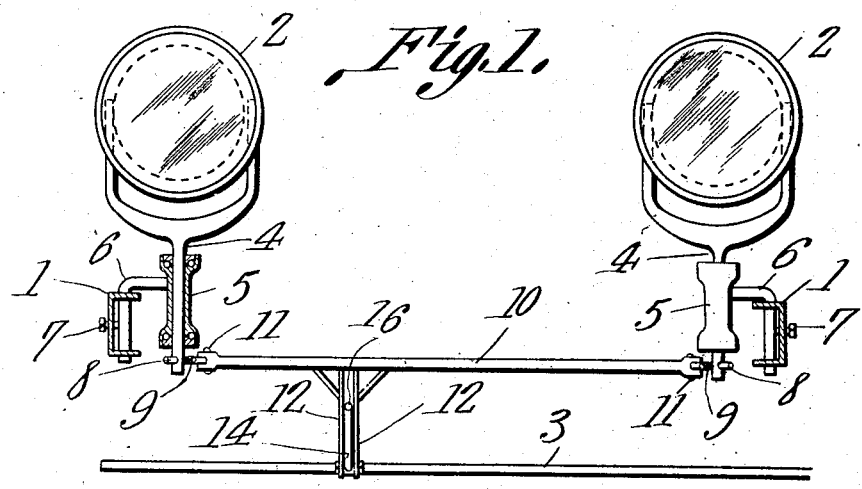
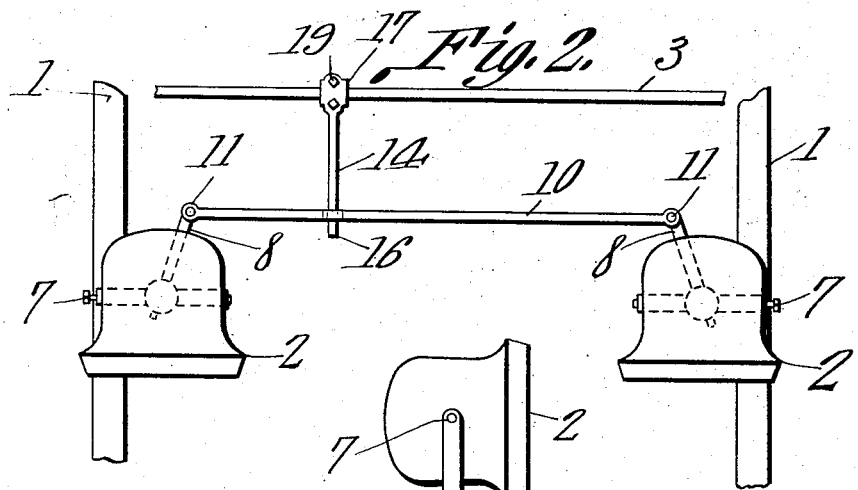
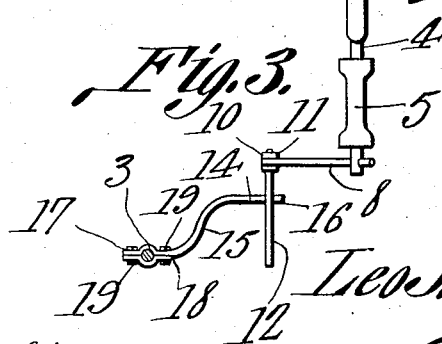
Witnesses
Leo J. Wogenstahl,
Inventor
by C. A. Snow & Co.
Attorneys

UNITED STATES PATENT OFFICE.

LEO J. WOGENSTAHL, OF SAN ANTONIO, TEXAS.

AUTOMOBILE-LAMP.

991,587. Specification of Letters Patent. Patented May 9, 1911.

Application filed June 21, 1910. Serial No. 568,116.

*To all whom it may concern:*

Be it known that I, LEO J. WOGENSTAHL, a citizen of the United States, residing at San Antonio, in the county of Bexar and State of Texas, have invented a new and useful Automobile-Lamp, of which the following is a specification.

It is the object of this invention to provide a simple and inexpensive means whereby the pivotally mounted lamps of a vehicle may be shifted in the direction in which the wheels of the vehicle are turned.

Another object of the invention is to provide a novel means for connecting the lamps of a vehicle with the wheel shifting cross rod thereof, so that a longitudinal reciprocation of said rod will produce a rotation of the lamps.

Another object of the invention is to provide a means for rotating the lamps of a vehicle, to follow the wheels thereof, said means being adjustable to vary the arc in which the lamps are swung, with respect to the extent of the arc in which the wheels of the vehicle are turned.

With the above and other objects in view, the invention consists in the novel construction and arrangement of parts hereinafter described, delineated in the drawings, and specifically claimed, it being understood that, within the scope of what is claimed, divers changes in the form, proportions, size, and minor details of the structure may be made, without departing from the spirit of the invention.

In the accompanying drawings,—Figure 1 shows the invention in front elevation, parts being broken away and sectioned; Fig. 2 is a top plan; and Fig. 3 is an end elevation; parts being broken away and sectioned.

In the drawings, the chassis of the vehicle is denoted by the numeral 1; the lamps by the numeral 2, and the rod whereby the forward wheels of the vehicle are turned, by the numeral 3; the construction above described being common and well known.

The lamps 2 are pivotally supported in standards 4, these standards being mounted for rotation, antifrictionally, and preferably upon ball bearings, in heads 5, secured to or formed integrally with, the angle members 6, the upright portions of which are rotatably mounted in the chassis 1. The angle members 6 are held against rotation, by means of set screws 7, inserted into the chassis 1, and bearing against the angle members.

The standards 4 are prolonged below the heads 5 in which they are mounted. In the lower ends of the standards 4, there are openings, in which are mounted for reciprocation, transversely of the standards 4, arms 8, the same being retained against movement by means of set screws 9 inserted into the standards 4 and adapted to bear against the arms 8.

The arms 8 preferably extend rearwardly, and a rod 10 is pivotally connected at its ends, as denoted by the numeral 11, with the rearwardly disposed extremities of the arms 8.

Intermediate its ends, the rod 10 is provided with a depending projection, taking the form of spaced elements 12, preferably formed integrally with the rod. A finger 14 is provided, the forward end 16 of which is disposed between the elements 12, the rear end of the finger 14 being enlarged as denoted by the numeral 17, and adapted to bear upon the upper surface of the wheel-controlling cross rod 3 intermediate the ends of the same. A complemental member 18 coöperates with the enlargement 17 of the finger, in engaging the rod 3, the elements 17 and 18 being held together by means of securing bolts 19 or other members, adapted to a like end. Intermediate its ends, the finger 14 may be bent, as denoted by the numeral 15, so as to dispose its rear end slightly below the plane of its forward end.

It will be seen that by tightening the bolts 19, the finger 14 may be clamped upon the rod 3. As this rod 3 reciprocates longitudinally, to shift the wheels of the vehicle, the finger 14 will move to and fro, transversely of the vehicle. The forward end 16 of the finger, being engaged between the elements 12, will serve to shift the rod 10 longitudinally, the rod 10, in its turn, engaging the arms 8, and causing the standards 4 and the lamps 2 which are carried thereby, to rotate. Thus, as the rod 3 is shifted to turn the wheels of the vehicle, the lamps 2 will be shifted in a corresponding direction, so that, as the vehicle rounds a corner, the path in front of the vehicle will be lighted up.

It is to be noted that the forward ends of the arms 8 are adjustably held by means of the set screws 9 in the standards 4.

Thus, the effective length of the arms 8 may be changed, so that the lamps 2 may be made to revolve through an arc, either greater or less than that through which the wheels of the vehicle are turned when the rod 3 is reciprocated longitudinally.

By reason of the fact that the forward end 16 of the finger 14 is mounted for free vertical reciprocation between the elements 12, a movement of the vehicle upon its supporting springs, will have no effect in shaking the lamps.

The elements 12 are spaced apart, and when it is desired to assemble the device, the rear end of the finger 14 may be loosely clamped upon the rod 3. The forward end 16 of the finger may then be swung upwardly, to register between the spaced elements 12, whereupon the bolts 19 may be tightened, to hold the forward ends of the finger 14 in the position to which it has been elevated. Thus, the final step in assembling the device may be carried forward readily, and without bending or shaping any of the parts.

By loosening the set screws 7, the upright portions of the angle members 6 may be rotated in the chassis 1, thus permitting the heads 5 to be positioned relatively near to the chassis 1, or moved away therefrom toward the longitudinal center of the vehicle, as may be desired. By reason of this construction, together with the further fact that the arms 8 may, by loosening the set screws 9, be slid longitudinally in the standards 4, the distance between the standards 4 and the rod 3 may be adjusted through a wide range, and likewise, proper adjustment may be made for different widths of vehicle frames.

Having thus described the invention, what is claimed is:—

The combination with a vehicle frame, of angle members consisting of upright portions journaled in the frame and horizontal portions protruding toward the longitudinal center of the frame; adjustable clamping devices in the frame engaging the upright portions of the angle members to hold the same against rotation; upright heads upon the inner ends of the horizontal portions of the angle members; lamp carrying standards rotatable in the heads; arms inserted through the standards and slidable longitudinally therein; adjustable clamping devices mounted in the standards and adapted to bear against the arms to hold the same against sliding movement; a rod pivoted adjacent its ends to the arms; spaced, upright elements depending from the rod; and a finger having its ends disposed in different horizontal planes, one end of the finger being vertically slidable between the upright elements, and the other end of the finger being provided with means to engage the transverse steering rod of a vehicle.

In testimony that I claim the foregoing as my own, I have hereto affixed my signature in the presence of two witnesses.

LEO J. WOGENSTAHL.

Witnesses:
B. A. PETERS,
W. I. McILHENNY.

---

Copies of this patent may be obtained for five cents each, by addressing the "Commissioner of Patents, Washington, D. C."